(12) United States Patent
Rusnack et al.

(10) Patent No.: US 7,824,554 B2
(45) Date of Patent: Nov. 2, 2010

(54) AUTOMATED APPARATUS AND PROCESS FOR THE CONTROLLED SHUTDOWN AND START-UP FOR A WASTEWATER TREATMENT SYSTEM

(75) Inventors: Michael R. Rusnack, Star, ID (US); Stephen D. Allen, Eagle, ID (US)

(73) Assignee: Water Solutions, Inc., Eagle, ID (US)

( * ) Notice: Subject to any disclaimer, the term of this patent is extended or adjusted under 35 U.S.C. 154(b) by 159 days.

(21) Appl. No.: 11/956,746

(22) Filed: Dec. 14, 2007

(65) Prior Publication Data

US 2008/0142451 A1  Jun. 19, 2008

Related U.S. Application Data

(60) Provisional application No. 60/869,946, filed on Dec. 14, 2006.

(51) Int. Cl.
*C02F 1/00* (2006.01)

(52) U.S. Cl. .................. 210/744; 210/739; 210/805

(58) Field of Classification Search ............. 210/110, 210/134, 143, 194, 195.1, 196, 257.1, 258, 210/259, 409, 767, 791, 805, 605, 620, 621, 210/622, 630, 631, 636, 739, 748, 760, 764, 210/744; 137/240, 395, 571; 134/10
See application file for complete search history.

(56) References Cited

U.S. PATENT DOCUMENTS 3,939,070 A * 2/1976 Roth ..................... 210/636

2008/0314806 A1 * 12/2008 Okamoto .................. 210/85

OTHER PUBLICATIONS

WO 2006/011241 A1, "Waste Water Purification Apparatus", Okamoto, WIPO, Feb. 2, 2006.*
WO 2006/011241 A1, "Waste Water Purification Apparatus", Okamoto, WIPO, Feb. 2, 2006 (English Translation).*

* cited by examiner

*Primary Examiner*—Matthew O Savage
*Assistant Examiner*—Paul J Durand
(74) *Attorney, Agent, or Firm*—Kirton & McConkie; Evan R. Witt

(57) ABSTRACT

An apparatus and method for cleaning and shutting down a part-time wastewater treatment system is disclosed. The wastewater treatment system has a water input to receive an influent flow of wastewater to be treated, a water output to discharge treated clean water effluent, and a water treatment capacity volume. An effluent external tank receives the clean water effluent and has a size greater than or equal to the capacity volume. Influent flow of wastewater is terminated. Clean water effluent is pumped through a fluid pathway from the effluent external tank to the water input. A sufficient volume of clean water effluent is passed through the wastewater treatment system to complete treatment of the wastewater within the wastewater treatment system, purge wastewater from the wastewater treatment system, and fill the wastewater treatment system with clean water effluent. The wastewater treatment system is thus prepared to be shut down.

10 Claims, 3 Drawing Sheets

US 7,824,554 B2

AUTOMATED APPARATUS AND PROCESS FOR THE CONTROLLED SHUTDOWN AND START-UP FOR A WASTEWATER TREATMENT SYSTEM

CROSS-REFERENCE TO RELATED APPLICATION

This application claims the benefit of U.S. Provisional Patent Application 60/869,946, filed Dec. 14, 2006, which application is incorporated by reference.

BACKGROUND OF THE INVENTION

This invention relates to an automated apparatus and process for the controlled shutdown and start-up of a wastewater treatment system. The invention is particularly adapted for use with wastewater treatment systems that are not operated on a fulltime basis, but experience periods of inoperation.

U.S. Federal Regulations set strict limitations for water discharged into the environment from Publicly Owned Treatment Works (POTW). Such requirements, and others like them, dictate the management and regulation of the wastewater discharge to the POTW facilities. To meet these requirements, industrial users are being required to install wastewater pretreatment plants. These pretreatment plants will typically reduce the biochemical oxygen demand (BOD), chemical oxygen demand (COD), total suspended solids (TSS) and other regulated parameters from the waste stream prior to discharge tot eh POTW. Though a significant investment of capital and day to day operational costs is typically less than the surcharges and fines levied by the treatment works, this is often not considered in the long term view.

The typical water treatment system is demanded upon 24 hours per day, 7 days per week (24×7). This presumption is that the system will be fed a constant flow of wastewater for treatment. The operation that is generating the waste is presumed to operate 24×7. The less typical operation is a plant that operated one or two shifts. Even three shifts, however will shut down over weekends or holidays. The treatment system will operate as long as there is demand, that is, influent wastewater.

For example, smaller operations may operate only 8-16 hours per day, 5 days per week. Whereas, a typical wastewater treatment system operates optimally on a continuous flow basis 24 hours per day. To enable the wastewater treatment system to operate continuously, even when wastewater is generated discontinuously, a buffer tank may be provided in advance of the treatment system. The tank buffers the feed to the treatment system by providing a reservoir during the down time of the production, thus ensuring a continuous wastewater flow between the day's shutdown and start-up the next day.

Of greater challenge is the shutdown of the wastewater treatment system during periods of no influent wastewater flow. Plants of this nature run 5 days per week, shutting down completely on Friday evening and restarting Monday morning, for example. The buffer tank would now have to be sized 5-7 times that required in the previous example. Though this solves the continuous flow problem, it the wastewater maintained in the buffer tank is biologically active and if it is left untreated as it would over the several days of the down time, the material in the tank can and will turn septic.

A solution offered would be to manually interrupt the flow to the waste treatment system, purge the system with clean water rinsing the system twice. Start-up after the shut-down is accomplished normally. This solution, however, requires a significant volume of fresh water to purge the system. Obtaining the needed fresh water represents a significant acquisition and discharge cost. It would be an improvement in the art to provide an apparatus and process for the shutdown and start-up of a wastewater treatment system that does no require an external source of fresh water. It would be a further advancement in the art to provide a self-contained apparatus and process for the shutdown and start-up of a part-time wastewater treatment system.

BRIEF SUMMARY OF THE INVENTION

In accordance with the present invention, there is provided herein an apparatus for the controlled shutdown of a part-time wastewater treatment system. The part-time wastewater treatment system has a water input to receive a flow of influent wastewater to be treated, a water output to discharge treated clean water effluent, and a water treatment capacity volume. An effluent external tank is disposed to receive the clean water effluent. It preferably has a size greater than or equal to the water treatment capacity volume. In one embodiment, the effluent external tank may have a volume comprising at least two volumes of the water treatment capacity volume of clean water effluent. The clean water effluent is preferably treated to be substantially free of pathogens. A fluid pathway is disposed between the effluent external tank and the water input for transporting clean water effluent to the water input. One or more valves are provided to terminate influent wastewater flow into the water input and to control clean water effluent flow into the water input.

A control system may be provided to automatically control the clean water effluent flow into the water input when the flow of influent wastewater to be treated is terminated. One or more sensors may be provided to detect when the flow of influent wastewater to be treated is terminated. The control system may control the volume of clean water effluent directed into the water influent of the wastewater treatment system. The control system may include suitable sensors, valves, pumps, and computer control software to operate the cleaning and shut-down of the wastewater treatment system.

A used herein, a "part-time" wastewater treatment system is one which experiences intermittent periods of inoperation the create a need for wastewater to be purged from the wastewater treatment system. The intermittent periods of inoperation will typically last for at least a few hours, but may last for several days, or longer. In one embodiment, the intermittent periods of inoperation last bout 4 or more hours.

The apparatus may optionally include an influent buffer tank disposed to receive wastewater to be treated by the wastewater treatment system. The influent buffer tank directs water into the water input of the wastewater treatment system. The water may include wastewater to be treated or it may include clean water effluent that was processed by the wastewater treatment system. If the apparatus includes an influent buffer tank, then the fluid pathway preferably transports clean water effluent to the influent buffer tank which directs clean water effluent into the water input.

The present invention also includes a method for cleaning and shutting down a part-time wastewater treatment system. As described above, the wastewater treatment system has a water input to receive an influent flow of wastewater to be treated, a water output to discharge treated clean water effluent, and a water treatment capacity volume. An effluent external tank as described above is disposed to receive the clean water effluent, treated to render it substantially free of pathogens.

The method includes terminating the influent flow of wastewater to be treated to the water input of the wastewater treatment system. This may be performed manually or automatically, depending upon the source of the wastewater and the treatment system. Clean water effluent is pumped from the effluent external tank to the water input. A sufficient volume of clean water effluent is passed through the wastewater treatment system to move existing wastewater through the system so it can be completely treated. This purges the wastewater treatment system and fills the treatment system with clean water effluent. The wastewater treatment system may then be safely shut down.

As described above, a control system may be used to automatically control one or more steps of the method for shutting down a part-time wastewater treatment system. For example, the control system may control the steps of terminating the influent flow of wastewater to the water input, pumping clean water effluent from the effluent external tank, and passing a sufficient volume of clean water effluent through the wastewater treatment system. The sufficient volume of clean water effluent may comprise at least two volume of the water treatment capacity volume of clean water effluent.

One or more sensors may be provide to detect when the flow of influent wastewater to be treated is terminated. The control system may further determine if a predetermined period of no flow of influent wastewater has occurred and then initiate the steps of terminating the influent flow of wastewater to the water input, pumping clean water effluent from the effluent external tank, and passing a sufficient volume of clean water effluent through the wastewater treatment system.

An influent buffer tank may be disposed to receive wastewater to be treated by the wastewater treatment system and to direct water into the water influent of the wastewater treatment system. In this embodiment, clean water effluent is preferably pumped from the effluent external tank to the influent buffer tank and then directed into the water input.

The present invention also includes a method for starting up a part-time wastewater treatment system that has been cleaned and shut down as described above. This method includes initiating the flow of influent wastewater to the water input of the wastewater treatment system and terminating the flow of clean water effluent to the water input. The wastewater treatment system may then be operated normally to produce clean water effluent.

One useful advantage of the apparatus and method described herein is the ability to shut down a part-time wastewater treatment system without the need for external fresh water. The apparatus and method are self-contained.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiments, but may refer to every embodiment.

Furthermore, the described features, advantages, and characteristics of the invention may be combined in any suitable manner in one or more embodiments. One skilled in the relevant art will recognize that the invention may be practiced without on or more of the specific features of advantages or a particular embodiment. In other instances, additional features and advantages may be recognized in certain embodiments that may not be presented in all embodiments of the invention.

These features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, specific details are given to provide a thorough understanding of embodiments of the invention. One skilled in the relevant art will recognize, however, that the invention may be practiced without one or more of the specific details or method steps, or with other methods, components, materials, and so forth. In other instances, well-know structures, materials, or operations are not shown or described in detail to avoid obstructing aspects of the invention.

The embodiments of the present invention will be best understood by reference to the drawings, wherein like part are designated by like numerals throughout. It will be readily understood that the components of the present invention, as generally described and illustrated in the figures here, could be arranged and designed in a wide variety of different configurations. Thus, the following more detailed description of the embodiments of the automated apparatus and process for the controlled shutdown and start-up for a wastewater treatment system within the scope of the present invention as represented in the Figures, is not intended to limit the scope of the invention, as claimed, but is merely representative of the embodiments of the invention.

Figure 1:
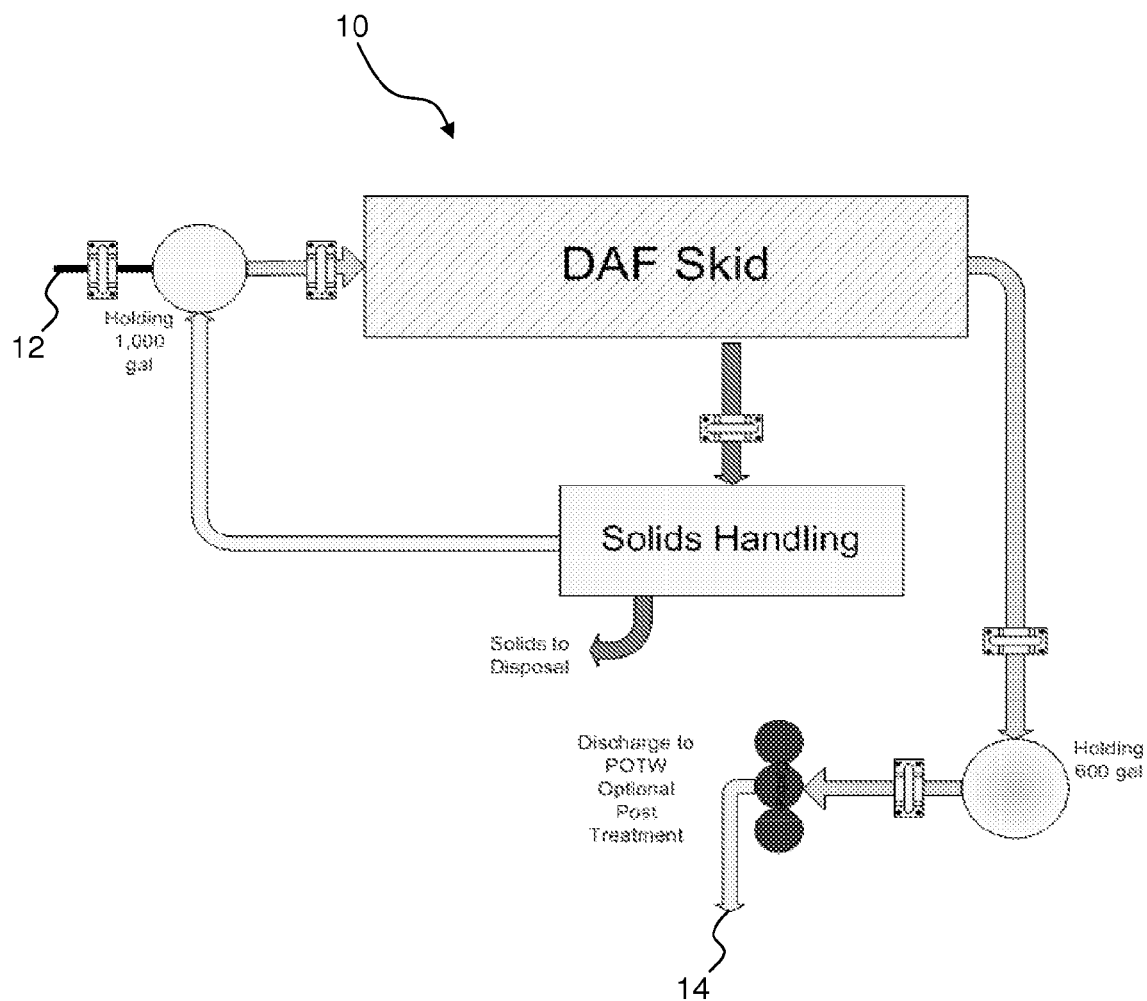
FIG. 1 is a schematic representation of a wastewater treatment system, specifically, a Dissolved Air Flotation (DAF) treatment system capable of treating a constant flow of 30 GPM having a system capacity volume of 2100 gallons.

Referring to FIG. 1, there is provided a schematic representation of a wastewater treatment system 10. The system 10 has a water input 12 to receive a flow of influent wastewater to be treated and a water output 14 to discharge treated clean water effluent. In the non-limiting embodiment illustrate in FIG. 1, the system 10 is a Dissolved Air Flotation (DAF) treatment system. Assuming the system 10 is capable of treating a constant flow of 30 GPM in 70 minutes, it will require approximately 2,100 gallons of water to purge the system, that is, the system capacity volume is 2,100 gallons. Two purges would require 4,200 gallons. This operation will take approximately two and one-half hours of manual oversight. Besides wasting over 4,000 gallons of fresh water; the expense of the water is realized in both the acquisition cost, but the discharge cost as well.

Figure 2:
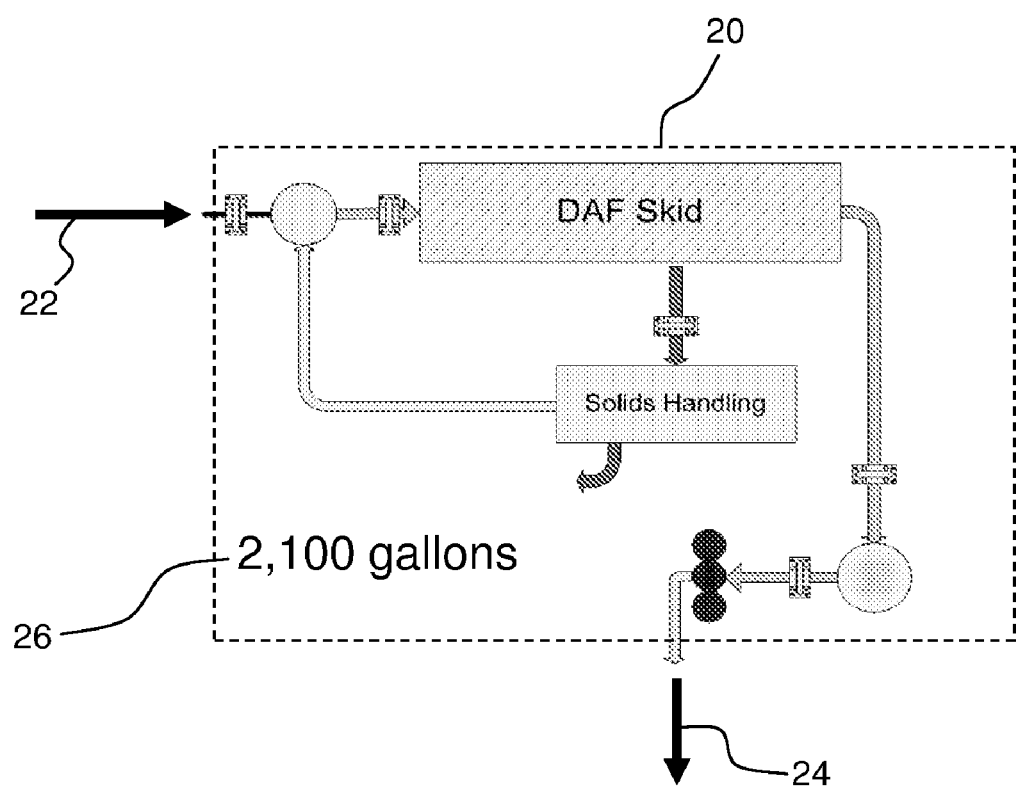
FIG. 2 is a schematic representation of the wastewater treatment system of FIG. 1 shown as a "black box" with an input, output, and capacity volume.

The water treatment system in FIG. 2 shows the water treatment system 10 illustrated in FIG. 1 as a "black box" 20 having a water input 22 and water output 24, with a known capacity volume 26 of the system itself. The term "black box" simply refers to the system with an input and output and capacity volume. The process and apparatus within the cope of the present invention may be applied to any water treatment system having a system input and output, with a known capacity volume. The process and apparatus within the scope of the present invention may be applied to any water treatment system having a system input and output, with a known capacity volume. The process steps that take place within the water treatment system have no effect on the process for shutting down the treatment system described herein. The water treatment system within the enclosed black box can be any type of treatment system with a known capacity. This includes, but is not limited to DAF, micro-filtration systems, or any treatment system providing clan water effluent. It is necessary to know the capacity of the black box 20 water treatment system as this amount of water must be maintained to prepare the system for shut down.

Figure 3:
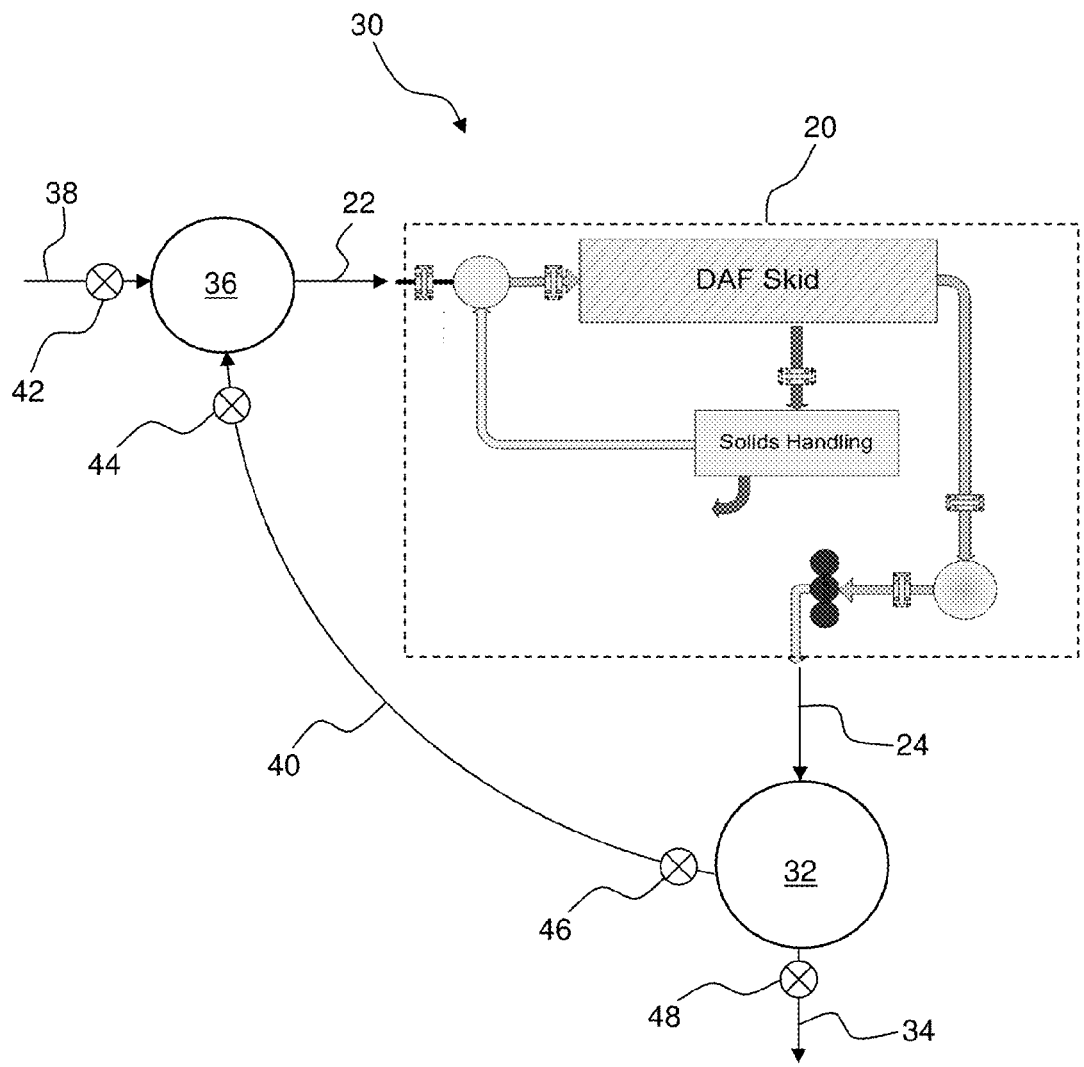
FIG. 3 is a schematic representation of a wastewater treatment system that may be cleaned and shutdown within the scope of the invention.

Referring to FIG. 3, an apparatus 30 for the controlled shutdown and start-up of a water treatment system is shown. The apparatus 30 includes a black box 20 water treatment system having a water input 22 and water output 24 as shown in FIG. 2. The water treatment system represented by black box 20 is preferably a part-time water treatment system subject to periods of inoperation. The apparatus 30 includes an effluent external tank 32 disposed to receive the clean water effluent from water outlet 24. The external tank 32 has a size greater than or equal to the water treatment capacity volume of the black box 20 water treatment system. The clean water effluent is treated to be substantially free of pathogens, bacteria or viruses. This can be accomplished by various mean including, but not limited to, bacterial stats, antivirus agents, anti mold agents, anti yeast agents, and strong oxidants. Some examples of strong oxidants include, but are not limited to, hypochlorite, chlorates, permanganates, and ozone. Clean water effluent 34 is discharged from external tank 32.

In cases where the flow of influent wastewater may be erratic, an optional influent buffer tank 36 may be provided to buffer the influent flow. When present, the buffer tank 36 receives influent wastewater 38 to be treated and directs water into the water input 22.

The cleaning/purging and shut down process is initiated when the influent wastewater 38 is terminated. One or more sensors (not shown) may be provided to detect when the flow of influent wastewater to be treated is terminated. Similarly, the shut down process is initiated when the buffer tank 36 is at a low level and no influent wastewater 38 is detected for a predetermined time.

A fluid pathway 40 is disposed between the effluent external tank 32 and the water input 22 for transporting clean water effluent to the water input 22. If the apparatus includes influent buffer tank 36, then the fluid pathway 40 transports clean water effluent to the buffer tank 36 which then directs clean water effluent into the water input 22.

One or more valves 42, 44, 46, and 48 may provide control of fluid flow into and out of external tank 32 and buffer tank 36. The valves are preferably coupled to a control system which controls their operation.

During the cleaning process, clean water effluent from effluent external tank 32 is pumped to the influent buffer tank 36. This water is processed by the black box 20 water treatment system at a rate similar tot eh typical rate of the system. For example, if the system operates at 35 GPM, then the water from the buffer tank 36 will be processed at 35 GPM. Interlocks, valves, sensors, and controls are preferably interconnected between the external tank 32 and the buffer tank 36 to ensure that neither over flows or is emptied to a low limit prior to completing the cleaning and purge cycle. When clean water effluent is passed through the black box 20 water treatment system, it may be possible and desirable to reduce or eliminate treatment chemicals that are normally required to treat wastewater.

Additional chemicals can be added to the clean water effluent that will serve as a cleaning agent to the membranes or other internal components of the black box 20 wastewater treatment system. For example the water input 22 can be treated with organic and inorganic polymers that pass through a micro-filtration system (non-limiting examples of which are disclosed in U.S. Pat. No. 6,755,973, which is incorporated by reference) prior to transfer to buffer tank 36.

The apparatus 30 is ready to be shut down when a sufficient volume of clean water effluent has been used to purge the wastewater from the water treatment system. Once the system and buffer tank (if present) contain only clean water, the entire system can be placed in stand-by mode for an indefinite period of time. Typically the cleaning and shut down process will be utilized when the flow of wastewater to be treated will be interrupted for 4 hours or more.

The following examples are given to illustrate various embodiments within the scope of the present invention. These are given by way of example only, and it is understood that the following examples are not comprehensive or exhaustive of the many types of embodiments of the present invention that can be prepared in accordance with the present invention.

EXAMPLE 1

The following non-limiting example is one of many possible implementations of the apparatus and method within the scope of the present invention.

An operator, timer, control system, or other means determines that the water treatment system is to be shut down. The system may be prepared to be shut down by the following sequence of events:

Effluent external tank 32 is preferably previously filled with clean water effluent from the water outlet 24. If necessary, the clean water effluent is treated to render is substantially free of pathogens.

In the event effluent external tank 32 has not been filled to a minimum capacity, additional clean water effluent may be diverted to this tank from the water outlet 24 while wastewater processing continues. In some embodiments, the minimum capacity is at least two system capacity volume of the treatment system.

The flow of influent wastewater 38 to buffer tank 36 or water input 22 is terminated. Valve 42 may be closed. The buffer tank 36, if present, will be at a low level. Low level may be indicated by a level sensor and by zero flow noted when pumping from the buffer tank 36 to the wastewater treatment system water input 22.

With the above criteria met, the system cleaning and purging process will begin.

Clean water effluent is pumped from effluent external tank 32 to water input 22. This may be directly or indirectly via the influent buffer tank 36.

A sufficient volume of clean water effluent is pumped into the water input 22 to complete treatment of wastewater within the wastewater treatment system. This purges wastewater from the wastewater treatment system and fills the treatment system with clean water effluent. The volume of clean water effluent may be determined by directly measuring fluid flow, measuring elapsed time, or measuring tank levels.

The rate of water flow to the water input 22 may be up to the maximum input rate of the water treatment system. The clean water may be processed by the treatment system without the need to add the treatment chemicals typically added during treatment process.

The water flow to the system is maintained until at least two volumes of treated and disinfected water have passed from water input 22 to the clean water outlet 24 of the wastewater treatment system. This operation ensures that any fluid in the system has been diluted with treated and disinfected water. Any components of the system i.e. membranes, pumps, sensors, probes, etc. are covered in or contact treated and disinfected clean water effluent.

It will be appreciated that the apparatus and process for the controlled shutdown and start-up for a wastewater treatment system may be partially or fully automated, depending upon the control system utilized. The invention provides a useful tool to shut down wastewater treatment systems that are not operated on a fulltime basis. The apparatus and process is self contained and does not require an external source of fresh water.

While specific embodiments of the present invention have been illustrated and described, numerous modifications come to mind without significantly departing from the spirit of the invention, and the scope of protection is only limited by the scope of the accompanying claims.

The invention claimed is:

1. A method for cleaning and shutting down a part-time wastewater treatment system having a water input to receive an influent flow of wastewater to be treated, a water output to discharge treated clean water effluent, and a water treatment capacity volume, the method comprising:
   obtaining an effluent external tank disposed to receive the clean water effluent and having a size greater than or equal to the water treatment capacity volume;
   treating the clean water effluent to render it substantially free of pathogens;
   terminating the influent flow of wastewater to be treated to the water input of the wastewater treatment system;
   pumping clean water effluent from the effluent external tank to the water input;
   passing a sufficient volume of clean water effluent through the wastewater treatment system to complete treatment of the wastewater within the wastewater treatment system thereby resulting in a purge of wastewater from the wastewater treatment system via said water output, and filling the treatment system with clean water effluent via said water input; and
   shutting down the wastewater treatment system.

2. The method for cleaning and shutting down a part-time wastewater treatment system according to claim 1, further comprising obtaining a control system to automatically control one or more steps of the method for shutting down a part-time wastewater treatment system.

3. The method for cleaning and shutting down a part-time wastewater treatment system according to claim 2, wherein the control system controls the steps of terminating the influent flow of wastewater to the water input, pumping clean water effluent from the effluent external tank, and passing a sufficient volume of clean water effluent through the wastewater treatment system.

4. The method for cleaning and shutting down a part-time wastewater treatment system according to claim 1, wherein the sufficient volume of clean water effluent comprises at least two volumes of the water treatment capacity volume of clean water effluent.

5. The method for cleaning and shutting down a part-time wastewater treatment system according to claim 1, further comprising obtaining an influent buffer tank disposed to receive wastewater to be treated by the wastewater treatment system and to direct water into the water influent of the wastewater treatment system and wherein clean water effluent is pumped from the effluent external tank to the influent buffer tank and then directed into the water input.

6. The method for cleaning and shutting down a part-time wastewater treatment system according to claim 1, further comprising detecting when the flow of influent wastewater to be treated is terminated.

7. The method for cleaning and shutting down a part-time wastewater treatment system according to claim 6, further comprising determining a predetermined period of no flow of influent wastewater to be treated and initiating the steps of terminating the influent flow of wastewater to the water input, pumping clean water effluent from the effluent external tank, and passing a sufficient volume of clean water effluent through the wastewater treatment system.

8. The method for cleaning and shutting down a part-time wastewater treatment system according to claim 1, wherein the part-time wastewater treatment system experiences intermittent periods of inoperation that create a need for wastewater to be purged from the wastewater treatment system.

9. The method for cleaning and shutting down a part-time wastewater treatment system according to claim 8, wherein the intermittent periods of inoperation last 4 or more hours.

10. A method for starting up a part-time wastewater treatment system that has been cleaned and shut down according to the method of claim 1, the method comprising:
   initiating the flow of influent wastewater to the water input of the wastewater treatment system;
   terminating the flow of clean water effluent to the water input; and
   operating the wastewater treatment system to produce clean water effluent.

* * * * *